US012679919B1

(12) United States Patent
Aminou et al.

(10) Patent No.: US 12,679,919 B1
(45) Date of Patent: Jul. 14, 2026

(54) AMBIENT-CURABLE RESIN FORMULATIONS

(71) Applicant: Southwire Company, LLC, Carrollton, GA (US)

(72) Inventors: Mohamadou Aminou, Villa Rica, GA (US); James Patrick, Carrollton, GA (US)

(73) Assignee: Southwire Company, LLC, Carrollton, GA (US)

( * ) Notice: Subject to any disclaimer, the term of this patent is extended or adjusted under 35 U.S.C. 154(b) by 816 days.

(21) Appl. No.: 17/901,458

(22) Filed: Sep. 1, 2022

Related U.S. Application Data

(60) Provisional application No. 63/239,486, filed on Sep. 1, 2021.

(51) Int. Cl.
| | |
|---|---|
| *C08F 263/04* | (2006.01) |
| *C08K 3/22* | (2006.01) |
| *C08K 5/54* | (2006.01) |
| *C08K 5/5425* | (2006.01) |

(52) U.S. Cl.
CPC .............. *C08F 263/04* (2013.01); *C08K 3/22* (2013.01); *C08K 5/5403* (2013.01); *C08K 5/5425* (2013.01); *C08L 2201/02* (2013.01); *C08L 2203/202* (2013.01)

(58) Field of Classification Search
CPC ........................... C08F 263/04; C08L 23/0853
See application file for complete search history.

(56) References Cited

U.S. PATENT DOCUMENTS

| | | | |
|---|---|---|---|
| 5,350,803 | A | 9/1994 | Prejean |
| 6,723,793 | B2 | 4/2004 | Oswald et al. |
| 6,936,655 | B2 | 8/2005 | Borke et al. |
| 7,153,571 | B2 | 12/2006 | Allermann |
| 8,191,266 | B2 | 6/2012 | Ducret |
| 8,192,813 | B2 | 6/2012 | Runyan et al. |
| 8,460,770 | B2 | 6/2013 | Chaudhary et al. |
| 10,047,211 | B2 | 8/2018 | Talreja et al. |
| 10,100,181 | B2 | 10/2018 | Douglas et al. |
| 2003/0132017 | A1 | 7/2003 | Barioz |
| 2006/0269772 | A1 | 11/2006 | Han et al. |
| 2010/0160471 | A1 | 6/2010 | Sengupta et al. |
| 2017/0145131 | A1 | 5/2017 | Ranganathan et al. |
| 2018/0230302 | A1 | 8/2018 | Slevin |
| 2018/0362793 | A1 | 12/2018 | Li et al. |
| 2019/0309117 | A1 | 10/2019 | Zhang et al. |
| 2020/0152347 | A1 | 5/2020 | Zhang et al. |
| 2020/0199397 | A1 | 6/2020 | Yu et al. |
| 2020/0299492 | A1 | 9/2020 | Li et al. |

FOREIGN PATENT DOCUMENTS

| | | | | |
|---|---|---|---|---|
| CN | 102219953 | A | * 10/2011 | ............. B29C 48/40 |
| CN | 104448520 | A | * 3/2015 | .......... C08L 23/0853 |

OTHER PUBLICATIONS

Machine translation of CN-102219953-A (2011, 5 pages).*
Machine translation of CN-104448520-A (2015, 8 pages).*

* cited by examiner

*Primary Examiner* — Brieann R Johnston
(74) *Attorney, Agent, or Firm* — Merchant & Gould P.C.

(57) ABSTRACT

Disclosed herein are ambient curable resin formulations comprising moisture scavenging, non-grafting silanes that improve the processability of the resin. Cable manufacturing methods comprising extrusion of the resin formulations are also disclosed herein, as advantageously allowing acceptable levels of cross-linking without requirement of conventional vulcanization and moisture cure processes. Resulting cables having a jacket with a reduced amount of scorch, and acceptably cross-linked jacket are also disclosed.

19 Claims, No Drawings

AMBIENT-CURABLE RESIN FORMULATIONS

CROSS-REFERENCE TO RELATED APPLICATION

This application claims a benefit of priority to U.S. Provisional Application No. 63/239,486, filed Sep. 1, 2021, which is hereby incorporated by reference herein, in its entirety.

BACKGROUND

Silane-grafted and crosslinked resins are desirable for use in many cable jacketing applications and typically require a post-extrusion curing process to improve strength and durability of the extruded product. Conventionally, post-extrusion crosslinking can be achieved by chemical and physical processes, including application of moisture and heating under increased pressure, irradiation with UV energy, and chemical cure processes including vulcanization, application of peroxides, and silane condensation. Each of these processes typically requires conditions that can damage cables and require additional manufacturing steps and associated cost. Ambient-cure processes are also known that do not require additional manufacturing steps, increased temperatures, pressures, and humidity. However, such processes employ highly active catalysts that interfere with the properties of the extruded polymer, particularly in formulations comprising inorganic hydrates in substantial amounts. Particularly, use of catalysts within conventional silane grafted resins has led to extruded products with unacceptable scorch, poor processibility, and poor strength and oil resistance.

Resin formulations comprising ambient cure silane crosslinking reagents and capable of being extruded into a high quality product without reduced scorch are desired.

SUMMARY

Disclosed herein are ambient cure resin formulations with improved curing and processability characteristics. In certain aspects, crosslinkable, fire retardant polymeric formulations disclosed herein can comprise a polymer component comprising a silane graftable polymer, a silane grafted polymer, or both; a fire retardant in an amount from 80 to 400 phr; a non-grafting silane in an amount from 3 phr to 25 phr, the non-grafting silane comprising a hydrolyzable substituent; and an ambient-cure catalyst. In certain aspects, the fire retardant, crosslinkable polymeric formulations disclosed herein comprising a silane graftable polymer can further comprise a grafting silane and a radical initiator.

Crosslinked polymeric compositions comprising the crosslinkable formulations disclosed herein, or the extruded product thereof are contemplated. Articles comprising crosslinked compositions are also contemplated herein, and can include low smoke zero halogen fire retardant cables.

Methods for producing a crosslinked polymeric composition are also disclosed herein, and in certain aspects, can comprise grafting a silane compound to a polymeric resin, compounding the polymeric resin with a fire retardant in an amount from 80 to 400 phr, an alkyl alkoxysilane in an amount greater than 5 phr, and an ambient-cure crosslinking catalyst, extruding the polymeric resin onto an article, and curing the polymeric resin under ambient conditions.

Both the foregoing summary and the following detailed description and examples are explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

DETAILED DESCRIPTION

Resin formulations comprising a reactive crosslinking catalyst, a fire retardant additive, and a non-grafting silane comprising a hydrolyzable substituent are disclosed herein. Without being bound by theory, it is believed that the non-grafting silane can operate as a moisture scavenger within the formulation and reduce the occurrence of scorch and other undesirable effects arising in the presence of conventional silane grafting and crosslinking compounds. In certain aspects, the non-grafting silane can comprise hydrolyzable substituents that may be cleaved by moisture present in the formulations, compositions, and articles described herein, under ambient conditions.

As used herein, "ambient conditions" will broadly refer to typical ambient post-extrusion conditions, which can include cool down, packaging, storage, transport, and other post-extrusion processing. Ambient conditions particularly refer to the temperature and relative humidity of the environment, and can span the range from 0° C. to 60° C. and 0% to 100% relative humidity in certain aspects. Additional ranges within these boundaries are also contemplated and encompassed by reference to ambient conditions herein, including temperatures from 0° C. to 60° C., from 0° C. to 40° C., from 20° C. to 60° C., from 20° C. to 30° C., from 15° C. to 25° C., from 10° C. to 30° C., and from 5° C. to 35° C. Ambient relative humidity also can include and encompass ranges from 30% to 70%, from 25% to 55%, from 35% to 65%, and from 45% to 65%. Where no narrower range is specified, the broadest range recited above will be presumed.

Generally, non-grafting silanes disclosed herein are not limited to any particular structure, and can be any that do not become covalently bonded to the polymer backbone during a grafting reaction. For instance, silanes comprising a vinyl or other unsaturated group have conventionally been employed by initiating a reaction between a radical and the vinyl unsaturated moiety in the silane which can then react to insert the silane within the polymer backbone structure. Thus, non-grafting silanes can generally include silanes that do not comprise an unsaturated group, e.g. a vinyl group, within the compound structure. In this manner, the non-grafting silane can be present within the formulation during grafting without being consumed during the graft reaction. Accordingly, by including a grafting silane and non-grafting silane as separate compounds within formulations, the degree of silane grafting and silane crosslinking in the extruded product can be controlled independently.

Non-grafting silanes can include, as a substitute for graft-reactive functional groups and moieties, any number of unreactive substituents with respect to the graft reaction. Thus, in certain aspects, the non-grafting silanes can be substituted with unreactive substituents including alkyl groups, amino groups, esters, ketones, aromatics, halogenated alkyl groups, mercapto substituents, and the like. Examples of non-grafting silanes therefore can include, but are not limited to, aminopropyl triethoxysilane, aminopropyl trimethoxysilane, aminoethyl aminopropyl trimethoxysilane, bis(trimethoxysilylpropyl)amine, aminopropylmethyldiethoxysilane, N-(2-aminoethyl)-3-aminopropylmethyldimethoxysilane, aminoethylaminopropyltriethoxysilane, chloropropyltriethoxysilane, chloropropyltrimethoxysilane, methyltris(ethyl lactate) silane, phenyltriethoxysilane, phenyltrimethoxysilane, mercaptopropyltrimethoxysilane, mercaptopropyl triethoxysilane.

Surprisingly, non-grafting silanes that include unreactive substituents can impart formulations disclosed herein with an improved processibility and increased resistance to scorch during extrusion. Non-grafting silanes contemplated herein can further comprise one, two, or three saturated substituents that are unreactive to radical initiators, such as any combination of branched or unbranched $C_1$-$C_{30}$ alkyl substituents. For instance, non-grafting silanes contemplated herein can comprise branched or unbranched mono-$C_1$-$C_{30}$ alkyl trialkoxysilanes, branched or unbranched bis-$C_1$-$C_{30}$ alkyl dialkoxysilanes, and branched or unbranched tris-$C_1$-$C_{30}$ alkyl alkoxysilanes. In certain aspects, unreactive alkyl substituents as part of suitable alkoxysilanes contemplated herein can comprise a $C_{16}$ alkyl substituent or a $C_{18}$ alkyl substituent, or both.

In certain aspects, non-grafting silanes can also be a moisture scavenger comprising a hydrolyzable substituent that may be cleaved from the silane in the presence of ambient moisture as part of a condensation reaction. Alkoxysilanes, for instance, comprise alkoxy substituents that may be hydrolyzed to form the corresponding alcohol and silanol, the silanol thus made available able to further react with components of the formulation, for instance by condensation with silane groups of the silane grafted polymer, condensation with oxygen groups present on the surface of fire retardant, condensation with other hydrolyzed non-grafting silanes, or any combination thereof.

Hydrolyzable substituents of silanes are not limited to alkoxy substituents. For instance, acetoxysilanes comprise aceto groups that can be hydrolyzed into acetic acid and the silanol. Non-grafting silanes also can include oxime-substituted silanes, for example tetrakis(methylethylketoxime) silane, methyl tris(methylethylketoxime) silane, and phenyl tris(methylethylketoxime) silane.

As will be understood by those of skill in the art according to the quaternary valency of silicon, non-grafting silanes disclosed herein also can include substituents other than hydrolyzable substituents. In certain aspects, non-grafting silanes can comprise a monoalkoxysilane, dialkoxysilane, trialkoxysilane, or tetralkoxysilane. Alkyl trialkoxysilanes are contemplated herein as being particularly effective as moisture scavengers due to higher content of the hydrolyzable alkoxy substituents. Non-grafting silanes contemplated herein include methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tridecyltriethoxysilane, tetradecyltriethoxysilane, pentadecyltriethoxysilane, hexadecyltriethoxysilane, and combinations thereof. Branched and unbranched $C_1$-$C_8$ trialkoxy equivalents of these trialkoxysilanes (e.g., octyl trimethoxysilane, octyl tri-n-butoxysilane, octyl tri-i-butoxysilane, and the like) are also contemplated herein. Non-grafting silanes contemplated herein also can comprise polymeric siloxanes such as polydiethoxysiloxane.

Non-grafting, hydrolyzable silanes as described above can be coupled with an ambient cure catalyst to promote the condensation of hydrolyzed silanes in extruded formulations, thereby effecting a post-extrusion curing under ambient conditions. Such catalysts can include tin-, zinc-, iron-, lead- or cobalt-organic compounds, and include dibutyl tin dilaurate (DBTDL) and dioctyl tin dilaurate (DOTDL). Compositions disclosed herein can contain a crosslinking catalyst in a range from 0.1 wt. % to 3 wt. %, or from 0.5 wt. % to 2 wt. %, without causing scorch during extrusion.

In certain aspects, the non-grafting silane can be present relative to the amount of polymer resin, expressed as parts per hundred rubber content (phr), and in a range from 1 to 50 phr, from 3 to 25 phr, or from 5 to 10 phr. Alternatively, the non-grafting silane can be expressed as an amount of the hydrolyzable substituents present relative to the amount of polymer resin, expressed as mmol hydrolyzable substituents per hundred rubber content (mmol hydrolyzable substituents phr), and in a range from 5 to 500 mmol hydrolyzable substituents phr, from 25 to 250 mmol hydrolyzable substituents phr, from 25 to 150 mmol hydrolyzable substituents phr, or from 25 to 100 mmol hydrolyzable substituents phr. The amount of the non-grafting silane also can be expressed as a wt. % of the formulation at any stage of the process (e.g., grafting resin, compounding resin, or extruded formulation). In certain aspects, the non-grafting silane can comprise a trialkoxysilane present in an amount from 0.1 wt. % to 10 wt. %, from 0.5 wt. % to 5 wt. %, or from 1 wt. % to 3 wt. %. Additionally, the amount of the non-grafting silane can be expressed relative to the amount of other components within the formulation, for instance relative to the amount of fire retardant. In certain aspects, the amount of non-grafting silane (or amount of hydrolyzable substituents of the non-grafting silane) in the formulation can be in a range from 0.01 to 10 mmol/g fire retardant, from 0.1 to 5 mmol/g fire retardant, from 0.1 to 2 mmol/g fire retardant, from 0.3 to 1 mmol/g fire retardant, or from 0.55 to 0.75 mmol/g fire retardant; alternatively, at least 0.1 mmol/g fire retardant, at least 0.3 mmol/g fire retardant, at least 0.5 mmol/g fire retardant, or at least 0.6 mmol/g fire retardant.

Compositions and formulations disclosed herein also can comprise a radical-forming grafting silane intended to facilitate grafting of the polymer resin. Contrary to the non-grafting silanes, grafting silanes referred to herein generally include those that comprise groups able to form reactive radical species and incorporate within the polymer backbone of a silane graftable resin. Generally, silanes comprising an unsaturated group such as a vinyl group will be considered a grafting silane for the purpose of this disclosure. For example, vinyl triethoxysilane (VTES) and vinyl trimethoxysilane (VTMS) are commonly employed in tandem with dicumyl peroxide initiator to facilitate silane grafting onto a polymeric substrate. Such grafting silanes and catalysts are also contemplated in the context of this disclosure, as reactive silane compounds or mixtures.

Similarly, silane graftable resins as referred to herein will refer to polymeric resins that can react with the generated reactive species of the grafting silanes, commonly a radical species. In certain aspects, the silane graftable polymer can comprise polymers of thermoplastic vulcanizates, propylene, ethylene, ethylene vinyl acetate, copolymers thereof, and combinations thereof. Suitable polymers and copolymers of ethylene and propylene include, for example polyethylene, polypropylene, ethylene-propylene copolymers, blends of polyethylene and polypropylene. In certain aspects the silane graftable polymer can be a thermoplastic polymer.

Formulations and compositions disclosed herein also can comprise a fire retardant. In certain aspects, the fire retardant can be an inorganic hydrate such as magnesium dihydrate, aluminum trihydrate, rare earth metal hydrates, or combinations thereof. While not being bound by theory, it is believed that presence of non-grafting silane in the composition may facilitate increased interaction between the silane grafted resin and the surface of the inorganic hydrate, leading at least in part to the observed improvements in composition processibility and post-extrusion crosslinking.

Formulations and compositions disclosed herein also can comprise further additives in order to enhance physical or other properties depending on the ultimate application for the conducting polymer composite. For example, typical additives which can be introduced into the composite formulation can include nucleating agents, antioxidants, coupling agents, ultraviolet absorbers or stabilizers, pigments, dyes, reinforcing fillers or polymer additives, slip agents, plasticizers, processing aids, lubricants, viscosity control agents, tackifiers, anti-blocking agents, surfactants, extender oils, metal deactivators, voltage stabilizers, smoke suppressants, and combinations thereof.

Fillers and additives can be added in amounts ranging from less than about 0.05 weight percent to more than about 70 weight percent of the total composite. The amount of the additives in the composite will correspondingly decrease the weight percent of other constituents required in the composite to maintain the properties described in the current invention.

Antioxidants suitable for the compositions disclosed herein can include hindered phenols such as tetrakis [methylene (3,5-di-t-butyl-4-hydroxyhydrocinnamate)]-methane, 4,4'-thiobis(2-methyl-6-tert-butylphenol), and thiodiethylene bis(3,5-di-tert-butyl-4-hydroxy) hydrocinnamate, phosphites and phosphonites such as tris(2,4-di-tert-butylphenyl) phosphite and thio compounds such as dilaurylthiodipropionate, dimyristylthiodipropionate, and distearylthiodipropionate, various siloxanes, and amines such as polymerized 2,2,4-trimethyl-1,2-dihydroquinoline and the like. Antioxidants can be used in amount of about 0.05 weight percent to about 2 weight percent of the total composite.

Articles comprising the formulations and extruded compositions are also contemplated herein. In certain aspects the formulations can be extruded onto a metal wire as a cable insulation or jacket. As described above, fire retardants and grafting silanes can exclude a halogen, and therefore the fire retardant article can be a zero-halogen fire-retardant cable. Manufacturing advantages achieved by the formulations disclosed herein, for instance avoiding a steam cure that can damage and misshape cable components, also provides particular advantage to multi-component articles that may become warped. Accordingly, tray cables comprising the formulations are contemplated herein as receiving particular benefit of the disclosed ambient cure formulations.

Methods for producing crosslinked polymeric compositions are also disclosed herein, and can comprise grafting a silane compound to a polymeric resin, compounding the polymeric resin with additives, extruding the polymeric resin onto an article, and curing the polymeric resin under ambient conditions. In certain aspects, compounding the polymeric resin can comprise additional polymeric components and any amount of additives and fillers listed above. For instance, the polymeric resin can be compounded with a fire retardant in an amount from 80 to 400 phr, an alkyl alkoxysilane in an amount greater than 5 phr, and an ambient-cure crosslinking catalyst such as dibutyltin dilaurate. In other aspects, the polymeric resin can be compounded with a fire retardant in an amount from 30 to 70 wt. %, an alkyl alkoxysilane in an amount from 0.5 wt. % to 5 wt. %, and from 0.1 to 1.0 wt. % of a crosslinking catalyst. In certain aspects, the fire retardant can be magnesium dihydrate, the alkyl alkoxysilane can be octyltriethoxysilane, and the crosslinking catalyst can be dibutyltin dilaurate.

In certain aspects, grafting, compounding and extruding steps can be conducted simultaneously, as part of a one-step process where formulation components are added to an extruder to achieve the desired grafting of a reactive silane compound to the resin, and compounding of additives and fillers as required for the desired formulation, such as a fire retardant to produce a fire retardant formulation. Alternatively, a resin component can be compounded and grafted separately, where grafting the polymeric component comprises combining a reactive silane mixture with the polymeric component. Additives including fire retardants, crosslinking catalysts, color concentrates, antioxidants, coupling agents, processing aids, alkyl alkoxysilanes, and the like can then be compounded with the grafted resin, either during or prior to extrusion of the grafted resin.

Where compounding or grafting is conducted as part of extrusion process, a twin screw extruder can be advantageous to achieve the desired compounding, allow sufficient time for activation of the grafting catalyst, or both, prior to extrusion of the polymer melt. Extrusion temperatures can be any that are suitable to apply the compounded resin to an article such as a cylindrical wire as a cable jacket. In certain aspects, the grafted, compounded polymer can be extruded at a temperature in a range from 180° C. to 320° C., from 200° C. to 300° C., or from 220° C. to 260° C.

Curing the extruded polymer component can be achieved at ambient conditions. As disclosed herein, ambient conditions can particularly refer to the temperature and humidity of the curing process. For example, sauna treatment of the extruded polymer at temperatures exceeding 70° C. and humidity exceeding 90%, as required for conventional curing processes for compositions with high inorganic hydrate content (e.g., moisture curing, vulcanization), can be excluded by reference to ambient conditions. The application of additional curing chemicals and treatments also can be excluded by reference to ambient conditions. For instance, treatment under UV light can be excluded by reference to ambient conditions.

In certain aspects, curing the conditions comprise allowing the extruded article to cure at cure temperature in a range from 0 to 60° C., and a cure humidity of 20 to 80%, for a period in a range from 1 to 30 days, from 3 days to 3 weeks, from about 1 to 3 weeks, less than about a week, less than about 2 weeks, or less than about a month. Curing of the extruded polymer can be determined as sufficiently complete according to strength characteristics of the extruded article. In certain aspects, curing the extruded article at ambient conditions results in a hot creep value of 12.5% and a set of 0% within a period of 3 days. In other aspects, the tensile strength can demonstrate effectiveness of the curing, on showing an increase of 5%, 10%, 20%, or more than 20% after a given curing period. For instance, the curing step can result in a tensile strength increase of more than 20% relative to the immediately extruded article, under ambient conditions for any of the cure periods disclosed above (e.g., less than 2 weeks). Similarly, elongation can be decreased in certain aspects as a measure of completion of the cure process, for instance by 5%, 10%, or 20% relative to the immediately extruded product. Extruded articles can comprise cables having a cable jacket layer in a width from 1 to 50 mm, and achieve a tensile strength of greater than 1500 psi by curing methods disclosed herein.

EXAMPLE EMBODIMENTS

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

For each example, formulations were extruded onto a 14 AWG wire, and resulting mechanical properties were determined following curing process as provided for each cable.

Example 1. Two Step Formulation Process

A silane grafted formulation was prepared by first mixing all components shown in Table A in a continuous mixer, except for the reactive silane blend. Once these components were sufficiently mixed, the reactive silane blend consisting of 96.25%:3.75% by weight of vinyltriethoxysilane and dicumyl peroxide was added to the remaining components with a twin screw extruder to form the silane grafted polymer Formulation 1A, as summarized in Table 1. Separately, Compounding Formulation 1B containing the cross-linking cure catalyst was prepared by mixing the components shown in the table below in a continuous mixer.

The silane grafted formulation and catalyst formulation were then compounded with a color concentrate in a Coperion ZSK-26 twin screw extruder in a 90:8:2 weight ratio, resulting in the final amounts as shown in Table 1 below. The formulation was then extruded onto a wire as a cable jacket. Example 2 was sauna cured for 18 hours at 70° C., 95% relative humidity to simulate a 21-day ambient cure condition.

TABLE 1

| Components | Formulation (phr) | Formulation (wt. %) |
|---|---|---|
| Graft Formulation | 308 | 90 |
| *Escorene ® 761.36 | 90 | 29.2 |
| *Coupling Agent | 10 | 3.2 |
| Kisuma ® 5JL | 190 | 61.7 |
| Tegopren ® 5885 | 3.0 | 1.0 |
| Irgafos ® 168 | 0.5 | 0.16 |
| DMS ® V35 | 2.5 | 0.81 |
| Andisil ® 137 | 8.0 | 2.3 |
| Vinyltriethoxysilane/ dicumyl peroxide (96.25 wt. %/3.75 wt. %) | 4.0 | 1.3 |
| Catalyst Formulation I | 27.4 | 8 |
| Escorene 761.36 | 6.8 | 2 |
| Coupling Agent | 1.4 | 0.4 |
| Irganox 1035 | 2.2 | 0.64 |
| ZMTI | 2.2 | 0.64 |
| Kisuma 5A | 13.7 | 4 |
| Zinc Stearate | 0.41 | 0.12 |
| DBTDL | 0.68 | 0.2 |
| Color concentrate (Total) | 6.8 | 2 |
| Extruded Formulation Total | 342.2 | 100 |

*Included as 'rubber' in phr determination.

Example 2. Extrusion Process Combining Grafting and Compounding in Single Step Example 2 follows the principle of Example 1, but conducts the silane grafting, compounding, and extrusion processes into a single step within a hybrid twin screw extruder (ZSK-26 twin screw extruder). In this example, the extruder was configured to allow sufficient residence time for decomposition of the peroxide, and compounded concentrate and additional materials as listed below in Table 2. Example 2 was cured by sauna temperatures noted in Table 4 below to simulate a 21-day ambient cure condition.

TABLE 2

| Components | Formulation (phr) | Formulation (wt. %) |
|---|---|---|
| Graft Formulation | 297 | 95 |
| *Levapren500 | 85 | 28.6 |
| *Coupling Agent | 15 | 5.1 |
| Zerogen 100SP | 175 | 58.9 |
| Maglite MgO | 5 | 1.7 |
| Tegopren 5885 | 3 | 1.0 |
| Naugard412S | 3 | 1.0 |
| Andisil 137 | 5 | 1.7 |
| Vinyltriethoxysilane/dicumyl peroxide (96.25%/3.75%) | 6 | 2.0 |
| Catalyst Formulation II | 12.5 | 4 |
| Engage 8003 | 3.6 | 1.1 |
| Coupling Agent | 0.63 | 0.2 |
| Irganox1330 | 3.1 | 1.0 |
| Zerogen 100SP | 4.4 | 1.4 |
| Zinc Stearate | 0.13 | 0.04 |
| DBTDL | 0.63 | 1.1 |
| Color concentrate | 3.1 | 1 |
| Extruded Formulation Total | 312.6 | 100 |

*Included as 'rubber' in phr determination.

Examples 3-8. Alternate Two Step Graft/Compounding Process

As provided above in Example 1, Examples 3-8 were prepared by forming a silane grafted resin in a first step according to Table 3A. The silane grafted resin was then compounded with a catalyst formulation as shown in Table 3B and a color concentrate in a twin screw extruder prior to extrusion, at a weight ratio of 95:4:1.

As for Examples 1 and 2, the resulting formulation was extruded as a cable jacket onto a 14 AWG. As for Example 2 above, Examples 3-8 were cured by sauna temperatures noted below for 18 hours to emulate a 21-day ambient cure condition

TABLE 3A

| Silane-grafted resin formulation components (by wt. %). | | | |
|---|---|---|---|
| Components | G-1 | G-2 | G-3 |
| Infuse ® 9530 | 68.11 | 68.11 | 68.6 |
| Orevac ® OE825 | | | 9.8 |
| Engage ® 8540G | | 29.4 | |
| Enable ® 2010CB | 29.4 | | 19.11 |
| ZnO/LLDPE MB (50/50) | 0.98 | 0.98 | 0.98 |
| Reactive Silane Blend | 1.51 | 1.51 | 1.79 |
| Vinyltriethoxysilane | 90 | 90 | 95 |
| Dicumyl peroxide | 5 | 5 | 5 |
| Maleic anhydride | 5 | 5 | |

TABLE 3B

| Catalyst Formulation III. | |
|---|---|
| Component | Amount (wt. %) |
| Engage ® 8003 | 29.6 |
| BNX 1010 | 0.4 |
| Zinc Oxide | 1.9 |

TABLE 3B-continued

Catalyst Formulation III.

| Component | Amount (wt. %) |
|---|---|
| Zerogen ®100SP | 63.0 |
| Dibutyltin dilaurate | 5.2 |

TABLE 3C

Components of extruded formulations for Examples 3-8 (by phr).

| Component | CF-3 | CF-4 | CF-5 | CF-6 | CF-7 | CF-8 |
|---|---|---|---|---|---|---|
| G-1 | 100 | 100 | | | | |
| G-2 | | | 100 | 100 | | |
| G-3 | | | | | 100 | 100 |
| Zerogen ® 100SP | 190 | 190 | 190 | 190 | 190 | 190 |
| PEG 8000 | 3 | 3 | 3 | 3 | 3 | 3 |
| BLS 531 | 1 | 1 | 1 | 1 | 1 | 1 |
| BNX 1076 | 2 | 2 | 2 | 2 | 2 | 2 |
| Naugard ® 412S | 1 | 1 | 1 | 1 | 1 | 1 |
| PSI 021 | | 3 | | 3 | | 3 |
| Andisil ® 137 | 3 | | 3 | | 3 | |
| Catalyst Formulation III (4 wt. %) | 12.6 | 12.6 | 12.6 | 12.6 | 12.6 | 12.6 |
| Color concentrate (1 wt. %) | 3.2 | 3.2 | 3.2 | 3.2 | 3.2 | 3.2 |
| Extruded Formulation Total | 315.8 | 315.8 | 315.8 | 315.8 | 315.8 | 315.8 |

Examples 9-14. Extrusion Processes Combining Grafting and Compounding in Single Step with Varying Ratios of Reactive Silane:Fire Retardant Examples 9-14 were prepared in similar methodology as Example 2, via a single step compound and graft method. The maleic anhydride-grafted LLDPE, LLDPE, and poly-ethylene wax were fed into the feed throat of the twin screw extruder and melted. Stearic acid treated magnesium dihydroxide (MDH), Irgafos 168, amide wax, and silicone process aid, were then fed into the side stuffer of the twin screw extruder. Each of the two silanes and dicumyl peroxide were then blended and direct injected into the twin screw.

Pellets of the above formulations were blended with either of a red (Examples 9, 11, and 13) or black (Examples 10, 12, and 14) color concentrate (2 wt. %) and a catalyst master-batch polymer formulation (5 wt. %) containing 1.5 wt. % dibutyltin dilaurate. The formulations compounded above represented the remaining 93 wt. %, as reflected in Table 4 below.

Each of the six formulations was extruded onto a 14 AWG wire, and characteristics examined as presented in Table 6 below.

TABLE 4

Silane-grafted resin formulation components, phr.

| Components | Examples 9-10 phr (wt. %) | Examples 11-12 phr (wt. %) | Examples 13-14 phr (wt. %) |
|---|---|---|---|
| LLDPE (Melt flow Index, 2 g/mL) | 5 | 5 | 5 |
| Maleic anhydride grafted LLDPE | 95 | 95 | 95 |
| Polyethylene wax | 3 | 3 | 3 |

TABLE 4-continued

Silane-grafted resin formulation components, phr.

| Components | Examples 9-10 phr (wt. %) | Examples 11-12 phr (wt. %) | Examples 13-14 phr (wt. %) |
|---|---|---|---|
| Stearic acid treated MDH | 105 (43.2) | 90 (39.7) | 80 (37.0) |
| Irgafos 168 | 0.5 | 0.5 | 0.5 |
| Amide wax (process aid) | 2.5 | 2.5 | 2.5 |
| Silicone process aid | 5 | 5 | 5 |
| Octyltriethyoxysilane | 5 (2.1) | 5 (2.2) | 5 (2.3) |
| Vinyltriethoxysilane | 4.95 | 4.95 | 4.95 |
| Dicumyl peroxide | 0.05 | 0.05 | 0.05 |
| Catalyst Formulation IV | 12.2 | 11.3 | 10.8 |
| Color concentrate | 4.8 | 4.5 | 4.3 |
| Total | 243.0 | 226.8 | 216.1 |

Results of Examples 1-8

Each of the extruded Examples 1-8 were examined for their appearance and certain mechanical properties related to curing, as shown in Table 5 below.

Surprisingly, each of Examples 1-2 demonstrated a smooth appearance despite the presence of the reactive ambient cure catalyst in each example during extrusion. Conventionally, DBTDL would be expected to scorch the final extruded product significantly. Examples 3, 5, and 7, also employed octyltriethoxysilane (Andisil® 137), yet did appear scorched by the extrusion with DBTDL, presumably due to accelerated crosslinking caused during extrusion by dibutyltin dilaurate.

More surprisingly, Examples 4, 6, and 8 each employed polydiethoxysiloxane (PSI 021) as the alkyl alkoxysilane, in equal amounts to the alkoxysilane compound present in Examples 3, 5, and 7, yet demonstrated a smooth finish to the cable following extrusion. Without being bound by theory, it is believed that the increased concentration of ethoxy groups per unit weight polydiethoxysiloxane relative to octyltriethoxysilane (Andisil® 137) imparted a greater capacity to scavenge moisture and interact with the surface of the inorganic hydroxides. It is further believed that this capacity to react with moisture and the surface of the inorganic hydroxides provides protection to the materials under extrusion conditions and in the presence of crosslinking catalysts, but does not inhibit action of the ambient cure crosslinking catalysts post-extrusion.

In this manner, it is demonstrated that formulations comprising an alkoxysilane compound in sufficient amounts, on an alkoxy group basis, can provide formulations that are able to be extruded onto cable without scorching and also cure under mild or ambient conditions. Within this understanding it can be observed that ability of the alkyl alkoxysilane to prevent scorch can be related to its alkoxy content. Particularly, the apparently disparate results between Examples 3, 5, and 7 containing Andisil 137, and Examples 4, 6, and 8 containing PSI021 can be explained by the increased concentration of ethoxy groups per weight of PSI021 (0.14 mmol/g extruded formulation) compared to that for Andisil 137 (0.11 mmol/g extruded formulation).

Extruded compositions comprising 0.14 mmol ethoxy/gram extruded formulation exhibited excellent appearance in the presence of DBTDL, and cured at ambient conditions.

TABLE 5

| Summary of Examples 1-8 following various curing conditions. | | | | | | | | |
|---|---|---|---|---|---|---|---|---|
| Example No. | 1 | 2 | 3 | 4 | 5 | 6 | 7 | 8 |
| Alkyl alkoxysilane | A137 | A137 | A137 | PSI021 | A137 | PSI021 | A137 | PSI021 |
| Alkyoxysilane (phr) | 8 | 5 | 3 | 3 | 3 | 3 | 3 | 3 |
| Alkoxysilane (wt. % in extruded formulation) | 2.3 | 1.5 | 0.95 | 0.95 | 0.95 | 0.95 | 0.95 | 0.95 |
| Alkoxy group (mmol/g extruded formulation) | 0.25 | 0.16 | 0.11 | 0.14 | 0.11 | 0.14 | 0.11 | 0.14 |
| Physical Properties-Unaged, 30 min Room Temp | | | | | | | | |
| Surface Appearance | Smooth | Smooth | Scorchy | Smooth | Scorchy | Smooth | Scorchy | Smooth |
| Tensile Strength, psi | | 1227 | | 1408 | | 1344 | | 1537 |
| Elongation, % | | 172 | | 195 | | 228 | | 133 |
| Unaged sauna cured, 90 C., 100% RH 18 hours | | | | | | | | |
| Tensile Strength, psi | | 1671* | | 1634 | | 1525 | | 1719 |
| Elongation, % | | 174* | | 126 | | 166 | | 122 |
| Properties After Oil Resistance Test** | | | | | | | | |
| Tensile Strength, psi | | 1039 | | 1190 | | 1122 | | 1232 |
| Elongation, % | | 148 | | 129 | | 123 | | 97 |
| Retained-Tensile | | 62 | | 73 | | 74 | | 72 |
| Retained-Elongation | | 85 | | 102 | | 74 | | 80 |

*Cured at 70° C., 95% RH, 18 hours.
**IRM 902 Oil at 121° C. for 18 Hours

Results of Examples 9-14

Each of the extruded Examples 9-14 were examined for their appearance and certain mechanical properties related to curing, as shown in Table 6 below.

As shown, the formulations of Examples 9-10 were very scorchy and produced a very scorchy extrudate that would not process or adhere to the wire, causing the process not to complete and requiring cleaning of the extruder. Examples 11-12 produced improved results relative to Examples 9-10, but only was able to produce a moderately smooth extrudate upon increasing the line speed and extruder screw to reduce the residence time in the extruder. Examples 13-14 were extruded successfully and produced a very smooth extrudate that adhered strongly to the wire. Examples 13-14 each retained a plastic appearance, whereas the surface of Examples 11-12 appeared dull.

As demonstrated in the table above, the physical properties of the insulations are indicative of the scorch seen when not enough alkoxysilane is used in a system. Each of the Examples 11-14 were examined for their physical properties as both sauna cured and uncured samples, as described above for Examples 1-8. As shown, Examples 13-14 showed excellent tensile strength and elongation after curing, without sacrificing to the cosmetic properties of the extruded cable or formulation processability.

Across Examples 9-14, the amount of alkoxy group relative to the total formulation was relatively constant (compared to Examples 1-8), whereas the relative amount of fire retardant was varied. Thus, without being bound by theory, it is believed that in certain aspects the amount of alkyoxysilane to achieve an ambient-cure formulation with acceptable extrusion properties may be relative to the amount of fire retardant present in the formulation.

TABLE 6

| Summary of Examples 9-11 following various curing conditions. | | | | | | |
|---|---|---|---|---|---|---|
| Example No. | 9 | 10 | 11 | 12 | 13 | 14 |
| Alkyl alkoxysilane | A137 | A137 | A137 | A137 | A137 | A137 |
| Color concentrate | Red | Black | Red | Black | Red | Black |
| Alkyoxysilane (phr) | 5 | 5 | 5 | 5 | 5 | 5 |
| Alkyoxysilane (wt. % of extruded formualtion) | 2.0 | 2.0 | 2.2 | 2.2 | 2.3 | 2.3 |
| Alkoxy group (mmol/g extruded formulation) | 0.22 | 0.22 | 0.24 | 0.24 | 0.25 | 0.25 |
| Alkoxy group (mmol/g fire retardant) | 0.51 | 0.51 | 0.60 | 0.60 | 0.68 | 0.68 |
| Physical Properties-Unaged, 30 min Room Temp | | | | | | |
| Surface Appearance | Very rough | Very rough | Moderately smooth | Moderately smooth | Very smooth | Very smooth |
| Tensile Strength, psi | — | — | 1847 | 1631 | 1784 | 1697 |
| Elongation, % | — | — | 151 | 137 | 461 | 393 |
| Unaged sauna cured, 90 C., 100% RH 18 hours | | | | | | |
| Tensile Strength, psi | — | — | 1828 | 1807 | 1934 | 1798 |
| Elongation, % | — | — | 40 | 29 | 270 | 273 |

The invention claimed is:

1. A crosslinkable, fire retardant formulation comprising:
a polymer component comprising a silane graftable polymer, a silane grafted polymer, or both;
from 30 wt. % to 70 wt. % of a fire retardant;
from 0.5 wt. % to 5 wt. % of a non-grafting silane, the non-grafting silane comprising a hydrolyzable substituent and an unreactive substituent; and
an ambient-cure catalyst;
wherein a total amount of hydrolyzable substituents of the non-grafting silane is in a range from 0.12 to 0.25 mmol per gram of the fire retardant formulation, and wherein a total amount of hydrolysable substituents of the non-grafting silane is in a range from 0.55 to 0.75 mmol per gram of the fire retardant.

2. The formulation of claim 1, wherein the polymer component comprises a silane graftable polymer, and further comprises a grafting silane.

3. The formulation of claim 2, wherein the grafting silane is vinyl trimethoxysilane or vinyl triethoxysilane.

4. The formulation of claim 2, further comprising a radical initiator to initiate a grafting reaction between the grafting silane and the silane graftable polymer.

5. The formulation of claim 4, wherein the radical initiator is dicumyl peroxide.

6. The formulation of claim 1, wherein the polymer component comprises an ethyl vinyl acetate copolymer.

7. The formulation of claim 1, wherein the fire retardant is selected from aluminum trihydrate, magnesium dihydrate, rare earth hydrate, or a combination thereof.

8. The formulation of claim 1, wherein the non-grafting silane is selected from an alkoxysilane, an acetoxysilane, a ketoximinosilane, or combinations thereof.

9. The formulation of claim 8, wherein the non-grafting silane is a polymeric tetraalkyl orthosilicate, a $C_1$-$C_{30}$ alkyl trimethoxysilane, or a $C_1$-$C_{30}$ alkyl triethoxysilane.

10. The formulation of claim 9, wherein the non-grafting silane is n-octyl triethoxysilane.

11. The formulation of claim 1, wherein the amount of non-grafting silane is in a range from 5 phr to 15 phr.

12. The formulation of claim 1, wherein the ambient-cure catalyst is dibutyltin dilaurate.

13. The formulation of claim 1, wherein the composition further comprises a processing aid, coupling agent, antioxidant, filler, or any combination thereof.

14. A cross-linked polymeric composition comprising the formulation of claim 1, or the extruded product thereof.

15. An article comprising the cross-linked composition of claim 14.

16. The article of claim 15, wherein the article is a fire retardant cable.

17. A method for producing a crosslinked polymeric composition, the method comprising:
grafting a silane to a polymer;
compounding the polymer with:
a fire retardant in an amount from 30 wt. % to 70 wt. %, based on the total weight of the cross-linked polymeric composition;
a non-grafting silane comprising a hydrolyzable substituent, wherein a total amount of the hydrolyzable substituent is in a range from 0.12 to 0.25 mmol per gram of the cross-linked polymeric composition and wherein a total amount of hydrolysable substituents of the non-grafting silane is in a range from 0.55 to 0.75 mmol per gram of the fire retardant, the non-grafting silane further comprising an unreactive substituent; and
an ambient-cure catalyst;
extruding the polymeric resin onto an article; and
curing the polymeric resin under ambient conditions.

18. The method of claim 17, wherein compounding the polymer is conducted as a single step within a twin screw extruder.

19. The method of claim 18, wherein grafting the silane to a polymer is conducted simultaneously with compounding the polymer.

* * * * *